United States Patent
Juang et al.

(10) Patent No.: US 8,879,585 B2
(45) Date of Patent: Nov. 4, 2014

(54) FRAME TIMING CONTROLLER AND FRAME TIMING CONTROL METHOD FOR TRIGGERING AT LEAST RECEIVER IN MOBILE STATION TO START RECEIVING TRANSMITTED INFORMATION OF BASE STATION BY REFERRING TO AT LEAST FRAME POINTER

(75) Inventors: Den-Kai Juang, Taichung (TW); Tzu-Hao Yu, Taipei (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 987 days.

(21) Appl. No.: 12/965,924

(22) Filed: Dec. 13, 2010

(65) Prior Publication Data

US 2011/0280354 A1  Nov. 17, 2011

Related U.S. Application Data

(60) Provisional application No. 61/334,200, filed on May 13, 2010.

(51) Int. Cl.
  *H04J 3/06* (2006.01)
  *H04L 27/26* (2006.01)
  *H04W 56/00* (2009.01)

(52) U.S. Cl.
  CPC ......... *H04W 56/006* (2013.01); *H04L 27/2679* (2013.01); *H04L 27/2656* (2013.01)
  USPC ............ 370/503; 370/509; 375/354; 375/355

(58) Field of Classification Search
  CPC ..... H04L 7/033; H04L 7/0012; H04L 7/0054; H04J 3/0685; H04J 3/0658; H04J 3/0638
  USPC .......... 370/503, 506, 509, 324; 375/354, 355, 375/357, 373
  See application file for complete search history.

(56) References Cited

U.S. PATENT DOCUMENTS

| | | | |
|---|---|---|---|
| 5,241,543 A * | 8/1993 | Amada et al. | 370/509 |
| 5,663,954 A | 9/1997 | Hakkanen | |
| 5,966,644 A | 10/1999 | Suzuki | |
| 6,243,372 B1 * | 6/2001 | Petch et al. | 370/350 |
| 7,248,658 B2 * | 7/2007 | Zalio | 375/355 |

(Continued)

FOREIGN PATENT DOCUMENTS

| | | |
|---|---|---|
| CN | 1531362 A | 9/2004 |
| CN | 101515850 B | 8/2011 |
| CN | 101615995 B | 2/2012 |

*Primary Examiner* — Rasheed Gidado
(74) *Attorney, Agent, or Firm* — Winston Hsu; Scott Margo

(57) ABSTRACT

A frame timing controller includes a timer, a frame timing control unit, and a frame pointer processing circuit. The timer is arranged to generate a timer value according to a first clock signal with a first clock frequency. The frame timing control unit is for triggering at least a receiver to start receiving transmitted information of a base station according to at least a frame pointer and the timer value, wherein the receiver processes an input signal to generate first samples at a first sampling rate corresponding to a sampling clock frequency and processes the first samples to generate an output signal including second samples at a second sampling rate corresponding to a second clock frequency of a second clock signal different from the sampling clock frequency. The frame pointer processing circuit is for generating and updating the frame pointer according to the output signal of the receiver.

32 Claims, 5 Drawing Sheets

(56) References Cited

U.S. PATENT DOCUMENTS

| | | | |
|---|---|---|---|
| 7,551,640 B1 * | 6/2009 | Klecka et al. | 370/465 |
| 7,948,405 B2 * | 5/2011 | Magrath | 341/61 |
| 8,248,974 B2 * | 8/2012 | Lin | 370/286 |
| 2003/0172327 A1 * | 9/2003 | Chen et al. | 714/700 |
| 2009/0323566 A1 | 12/2009 | Lin | |
| 2010/0091922 A1 | 4/2010 | Magrath | |

* cited by examiner

FRAME TIMING CONTROLLER AND FRAME TIMING CONTROL METHOD FOR TRIGGERING AT LEAST RECEIVER IN MOBILE STATION TO START RECEIVING TRANSMITTED INFORMATION OF BASE STATION BY REFERRING TO AT LEAST FRAME POINTER

CROSS REFERENCE TO RELATED APPLICATIONS

This application claims the benefit of U.S. provisional application No. 61/334,200, filed on May 13, 2010 and incorporated herein by reference.

BACKGROUND

The disclosed embodiments of the present invention relate to frame timing control, and more particularly, to a frame timing controller for triggering at least a receiver in a mobile station to start receiving transmitted information of a base station by referring to at least a frame pointer and related frame timing control method thereof.

In orthogonal frequency division multiple access (OFDMA) communication systems (e.g., a WiMAX (Worldwide Interoperability for Microwave Access) system, an LTE (Long Term Evolution) system, etc.), a mobile station (MS) has to simultaneously keep connections with multiple base stations (BS's). These BS's may have different fundamental sampling rates/signal bandwidths, but the frame lengths (or the frame interspacing) of the BS's are identical to each other. Taking the WiMAX system for example, there are five different fundamental sampling rates/signal bandwidths that should be supported by the hardware, and each frame length (or the frame interspacing) for these five different fundamental sampling rates/signal bandwidths is always equal to a fixed value such as 5 miliseconds. For some circumstances, the MS has to switch it's receiving/transmitting target from one BS to another BS. To achieve good connection quality and real-time signal processing, there are many properties of each associated BS that shall be maintained by the MS. One of these critical properties is the frame timing location. One simple way is to allocate one dedicated system timer or counter for each BS, but it brings higher cost which may be proportional to the number of associated BS's with which one MS tends to keep connections.

The other problem arises from the fact that the sampling clock frequency of the MS may be an interference source to either the operating radio frequency (RF) channel of the MS, or other communication systems. The common solution is to change the clock frequency of the MS to avoid the undesired performance degradation. However, as the counting frequency of the system timer/counter of the MS may be coherent with the sampling clock frequency, the change of the sampling clock frequency also changes the counting frequency of the system timer/counter of the MS. The frame timing control must be adjusted or modified for all of the associated BS's correspondingly.

Thus, there is a need for an innovative frame timing control scheme which can control the transmitter/receiver operation in a simple and efficient way.

SUMMARY

In accordance with exemplary embodiments of the present invention, a frame timing controller for triggering at least a receiver in a mobile station to start receiving transmitted information of a base station by referring to at least a frame pointer and related frame timing control method thereof are proposed to solve the above-mentioned problem.

According to a first aspect of the present invention, an exemplary frame timing controller is disclosed. The exemplary frame timing controller includes a timer, a frame timing control unit, and a frame pointer processing circuit. The timer is arranged to generate a timer value according to a first clock signal with a first clock frequency. The frame timing control unit is coupled to the timer, and implemented for triggering at least a receiver to start receiving transmitted information of a base station according to at least a frame pointer and the timer value, wherein the receiver processes an input signal to generate first samples at a first sampling rate corresponding to a sampling clock frequency and processes the first samples to generate an output signal including second samples at a second sampling rate corresponding to a second clock frequency of a second clock signal different from the sampling clock frequency. The frame pointer processing circuit is coupled to the frame timing control unit, and implemented for generating and updating the frame pointer according to the output signal of the receiver.

According to a second aspect of the present invention, an exemplary frame timing control method is disclosed. The exemplary frame timing control method includes the following steps: generating a timer value according to a first clock signal with a first clock frequency; triggering at least a receiver to start receiving transmitted information of a base station according to at least a frame pointer and the timer value, wherein the receiver processes an input signal to generate first samples at a first sampling rate corresponding to a sampling clock frequency of a sampling clock signal and processes the first samples to generate an output signal including second samples at a second sampling rate corresponding to a second clock frequency of a second clock signal, and the second clock frequency is different from the sampling clock frequency; and generating and updating the frame pointer according to the output signal of the receiver.

According to a third aspect of the present invention, an exemplary frame timing controller applied to a mobile station capable of communicating with a plurality of base stations having different signal bandwidths is disclosed. The exemplary frame timing controller includes a timer, a frame timing control unit, a frame timing offset estimation unit, and a frame pointer management unit. The timer is arranged to generate a timer value according to a first clock signal. The frame timing control unit is coupled to the timer, and implemented for triggering at least a receiver of the mobile station to start receiving transmitted information of a specific base station of the base stations according to at least a specific frame pointer of the specific base station and the timer value. The frame timing offset estimation unit is coupled to the receiver, and implemented for estimating a frame timing offset between a receiver start time of receiving the transmitted information and an actual frame start time of a frame according to an output signal of the receiver. The frame pointer management unit is coupled to the frame timing control unit and the frame timing offset estimation unit, and implemented for generating and maintaining a plurality of frame pointers for the base stations according to a second clock signal with a fixed clock frequency, wherein the specific frame pointer is updated according to at least the frame timing offset and a counter value of the second clock signal's clock cycles corresponding to a predetermined frame interspacing between two successive frames, and remaining frame pointers are updated according to the counter value.

According to a fourth aspect of the present invention, a frame timing control method applied to a mobile station capable of communicating with a plurality of base stations having different signal bandwidths is disclosed. The exemplary frame timing control method includes following steps: generating a timer value according to a first clock signal; triggering at least a receiver of the mobile station to start receiving transmitted information of a specific base station of the base stations according to at least a specific frame pointer of the specific base station and the timer value; estimating a frame timing offset between a receiver start time of receiving the transmitted information and an actual frame start time of a frame according to an output signal of the receiver; and generating and maintaining a plurality of frame pointers for the base stations according to a second clock signal with a fixed clock frequency, wherein the specific frame pointer is updated according to at least the frame timing offset and a counter value of the second clock signal's clock cycles corresponding to a predetermined frame interspacing between two successive frames, and remaining frame pointers are updated according to the counter value.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
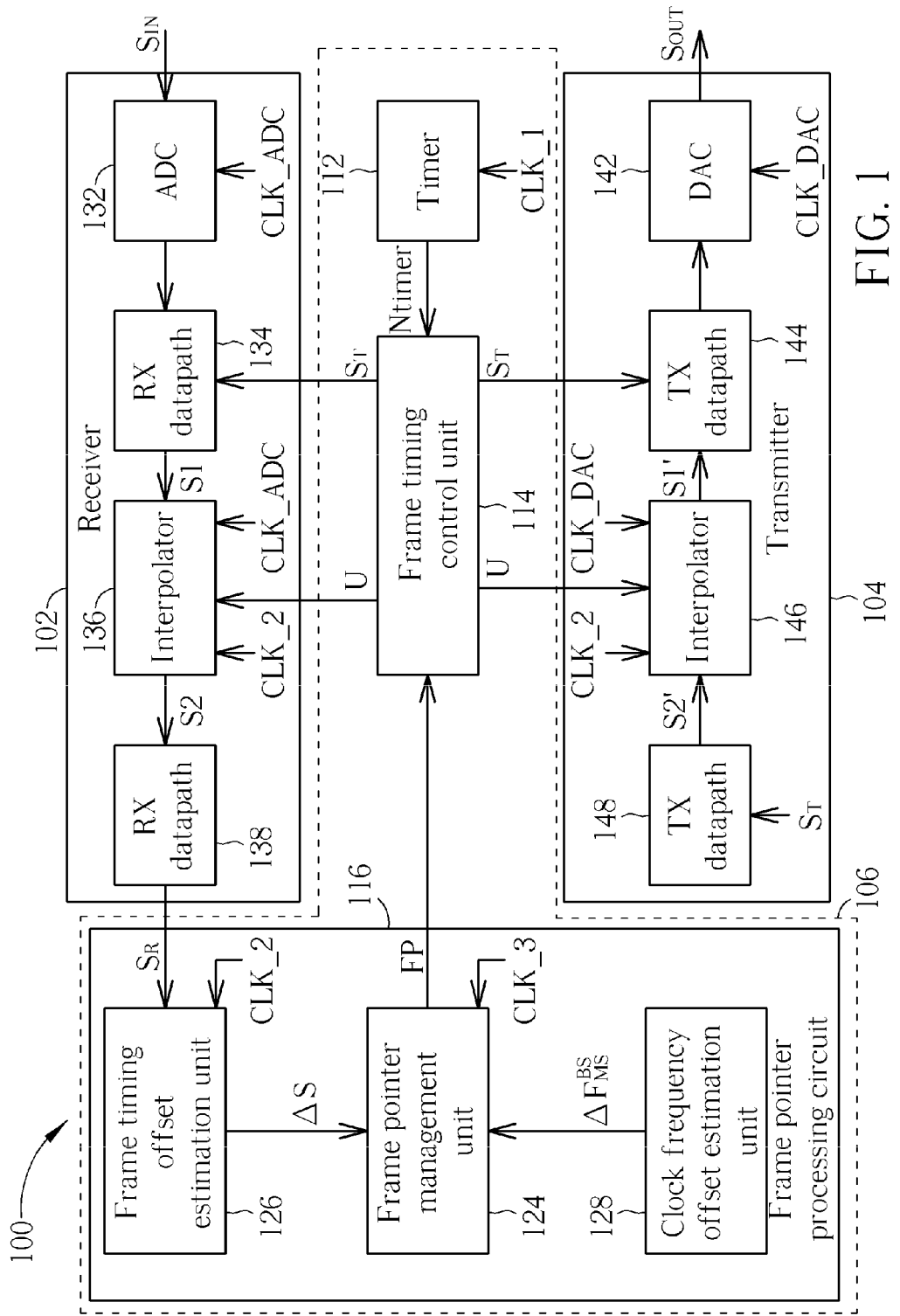
FIG. 1 is a block diagram of an exemplary embodiment of a mobile station according to the present invention.

FIG. 1 is a block diagram of an exemplary embodiment of a mobile station according to the present invention. The mobile station (MS) 100 includes a receiver 102, a transmitter 104, and a frame timing controller 106. In this exemplary embodiment, the frame timing controller 106 includes, but is not limited to, a timer 112, a frame timing control unit 114, a frame pointer processing circuit 116, wherein the frame pointer processing circuit 116 includes a frame pointer management unit 124, a frame timing offset estimation unit 126, and a clock frequency offset estimation unit 128. The timer 112 is arranged to generate a timer value $N_{timer}$ according to a first clock signal CLK_1 with a first clock frequency $F_{timer}$. It should be noted that the MS 100 may be used in an OFDMA communication system (e.g., a WiMAX system or an LTE system), and thus may need to keep connections with a plurality of base stations (BS's) having different signal bandwidths (e.g., different fundamental sampling frequencies). Therefore, the transmitted signal can be transmitted from the MS 100 to each BS, or the received signal can be transmitted from each BS to the MS 100. If the MS 100 employs a clock generator which can be configured to generate clock signals with different clock frequencies (e.g., different fundamental sampling frequencies), the cost, power consumption, and the performance of the clock generator are not as good as that of a clock generator which generates a clock signal with a fixed clock frequency. To enable the use of a clock generator which generates a clock signal with a fixed clock frequency, an interpolator acting as a rate converter is therefore employed in the receiver 102/transmitter 104.

Regarding the receiver 102, it includes an analog-to-digital converter (ADC) 132, a set of receiver datapaths (RX datapaths) 134 and 138, and an interpolator 136. Regarding the transmitter 104, it includes a digital-to-analog converter (DAC) 142, a set of transmitter datapaths (TX datapaths) 144 and 148, and an interpolator 146. The RX datapaths 134 and 138 include any component(s) needed for signal reception, and the TX datapaths 144 and 148 include any component(s) needed for signal transmission. When the receiver 102 receives transmitted information from a specific BS which uses a specific fundamental sampling frequency, the ADC 132 is configured to operate according to an ADC sampling clock signal CLK_ADC with a sampling clock frequency $F_{ADC}$ (not shown) different from the specific fundamental sampling frequency, and therefore processes an analog input signal $S_{IN}$ to generate first samples S1 at a first sampling rate corresponding to the ADC sampling clock frequency $F_{ADC}$ of the ADC sampling clock signal CLK_ADC. Next, the interpolator 136 turns the first samples S1 into an output signal $S_R$ which includes second samples S2 at a second sampling rate corresponding to a second clock frequency $F_S$ (not shown) of a second clock signal CLK_2, wherein the second clock frequency $F_S$ is identical to the specific fundamental sampling frequency used by the specific BS.

Similarly, when the transmitter 104 generates transmitted information to the specific BS which uses the specific fundamental sampling frequency, the interpolator 146 turns the second samples S2' included in an input signal $S_T$ at the second sampling rate into first samples S1' at the first sampling rate. The DAC 142 is configured to operate according to a DAC sampling clock signal CLK_DAC with a sampling clock frequency $F_{DAC}$ (not shown) different from the specific fundamental sampling frequency, and therefore processes the first samples S1' at the first sampling rate corresponding to the DAC sampling clock frequency and accordingly generates an analog output signal $S_{OUT}$. In one exemplary design, the sampling clock frequency $F_{ADC}$ is identical to the sampling clock frequency $F_{DAC}$, and the first clock frequency $F_{timer}$ of the first clock signal CLK_1 is coherent with (i.e., identical to) the sampling clock frequency $F_{ADC}/F_{DAC}$.

By way of example, but not limitation, the specific fundamental sampling frequency (i.e., the second clock frequency $F_S$ of the second clock signal CLK_2) may be 11.2 MHz, the sampling clock frequency of the ADC sampling clock signal CLK_ADC and/or DAC sampling clock signal CLK_DAC may be 11.25 MHz. In a case where the BS generates an analog signal according to 10000 samples at the fundamental rate of 11.2 MHz, the ADC 132 samples the analog signal according to the sampling clock frequency of 11.25 MHz. Therefore, the receiver 102 obtains $$10000 \times \frac{11.25 \text{ MHz}}{11.2 \text{ MHz}}$$

samples, and then the receiver 102 converts the samples generated from the ADC 132 into original 10000 samples by the interpolator 136.

For some scenarios, the MS 100 may switch its receiving/transmitting target from one BS to another BS. This kind of switching may be initiated by the MS 100 itself or by commands from the receiving/transmitting target. Regarding the MS 100, it should maintain the frame timing control not only for the BS which is the receiving/transmitting target, but also other BS's that may be selected as the receiving/transmitting target later. In a case where all the BS's have different signal bandwidths, the MS 100 may employ different ADC/DAC sampling clock frequencies when communicating with different BS's. In addition, even if the signal bandwidths of all BS's are identical to each other, there are circumstances that the MS 100 may want to use different ADC/DAC sampling clock frequencies for receiving signals from or transmitting signals to different BS's. For example, the harmonic of the ADC/DAC clock signal with a particular frequency may be an interference source to either the operating RF channel of the MS 100 or other communication systems. The present invention therefore proposes the use of the frame pointer processing circuit 116 to maintain frame pointers for these BS's. Further details are described as follows.

The frame timing offset estimation unit 126 is coupled to the receiver 102 and the frame pointer management unit 124, and implemented for estimating a frame timing offset ΔS between a receiver start time of receiving the transmitted information and an actual frame start time of a frame according to the output signal $S_R$. Please refer to FIG. 2, which is a diagram illustrating the operation of estimating the frame timing offset ΔS. As mentioned above, the output signal $S_R$ has second samples S2 transmitted at the second sampling rate corresponding to the second clock frequency $F_S$ (i.e., a fundamental sampling frequency used by a BS with which the MS 100 communicates). In general, there is a pre-defined preamble/synchronization signal with a known data pattern. Thus, the frame timing offset estimation unit 126 may estimate the frame timing offset ΔS by using the known data pattern.

Figure 2:
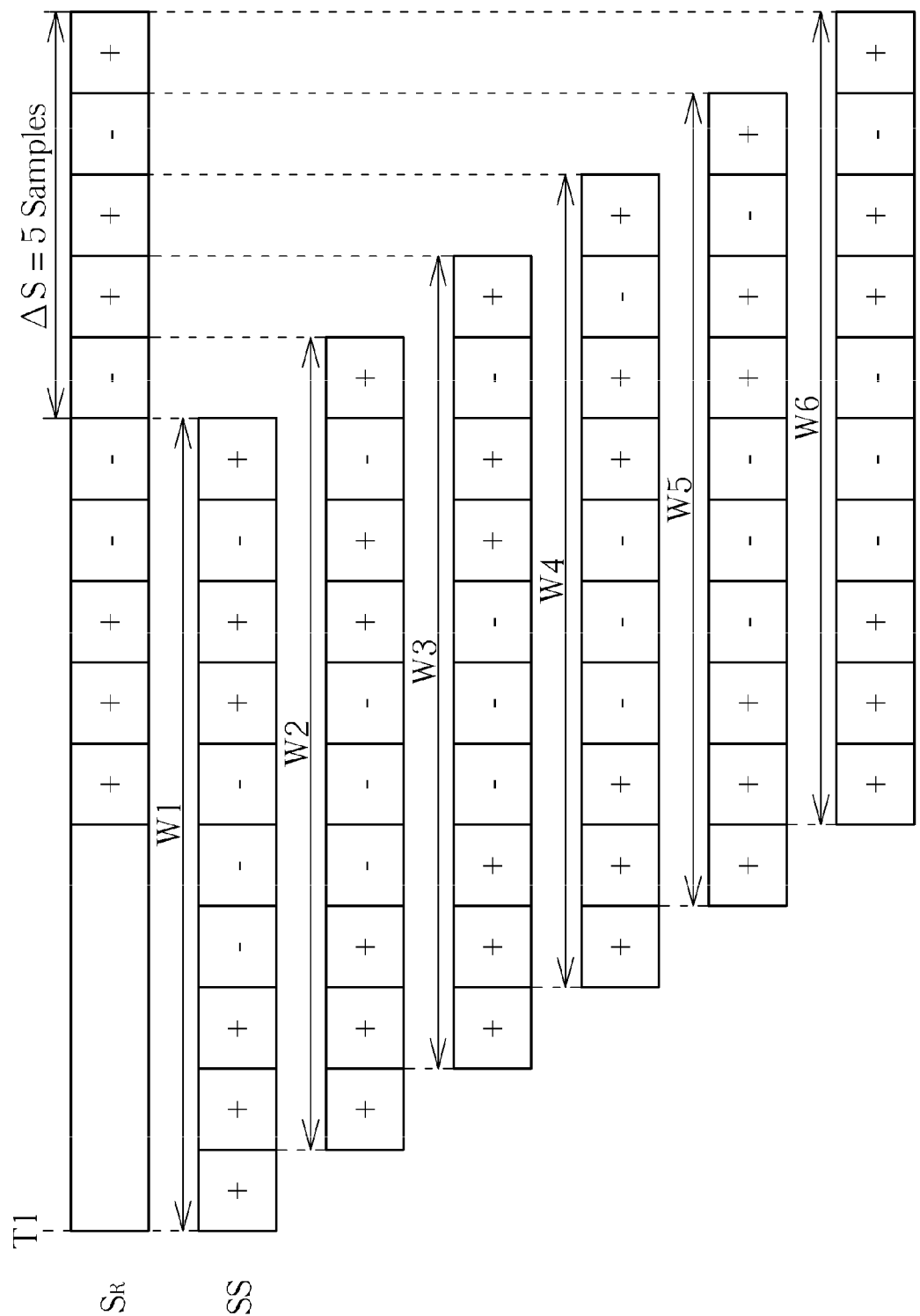
FIG. 2 is a diagram illustrating the operation of estimating the frame timing offset.

For example, the known data pattern may be represented by the following sample sequence "+++---++-+", where "+" represents a logic value "1" and "−" represents a logic value "0". Ideally, the known data pattern should start at the time point T1, as shown in FIG. 2. The frame timing offset estimation unit 126 calculates a correlation value between the known sample sequence SS and second samples of the output signal $S_R$ within an initial window W1 defined by the known sample sequence SS. Next, the frame timing offset estimation unit 126 shifts the window W1 by one sample, and then calculates another correlation value between the known sample sequence SS and second samples of the output signal $S_R$ within the shifted window W1 (i.e. shifted to be window W2) defined by the same known sample sequence SS. As can be seen from FIG. 2, the correlation value would have a maximum value when the frame timing offset estimation unit 126 has shifted the initial window W1 by five samples. That is, as the second samples of the output signal $S_R$ within the shifted window W6 are exactly identical to the samples include in the known sample sequence SS, the corresponding correlation value would be a maximum value among all correlation values derived from different windows for the same sample sequence SS. Thus, upon identification of the maximum correlation value, the frame timing offset estimation unit 126 is capable of determining the frame timing offset ΔS. In this example, the frame timing offset ΔS may be set by a counter value of the second clock's clock cycles (i.e., a total number of shifted samples) corresponding to the adjustment made to the window defined by the known sample sequence SS. Therefore, in this example, the frame timing offset estimation unit 126 may set the frame timing offset ΔS by 5.

It should be noted that the above is for illustrative purposes only, and is not meant to be a limitation to the present invention. That is, in an alternative design, the frame timing offset estimation unit 126 may estimate the frame timing offset ΔS by using other frame timing offset estimation scheme. This also obeys the spirit of the present invention.

The frame pointer management unit 124 is arranged to generate and maintain a frame pointer FP for each BS according to a third clock signal CLK_3 with a third clock frequency $F_V$ (not shown), wherein the frame pointer management unit 124 updates the frame pointer FP according to at least the frame timing offset ΔS generated from the frame timing offset estimation unit 126. Please note that the frame pointer management unit 124 may be implemented by hardware, software, or a combination of both. For example, the frame pointer management unit 124 may be realized by a digital signal processor (DSP), a microprocessor, or a state machine.

In a first exemplary implementation, the frame pointer management unit 124 updates the frame pointer FP to a next value (e.g., $FP_N$ for the $N^{th}$ frame) according to a current value (e.g., $FP_{N-1}$ for the $(N-1)^{th}$ frame), a counter value $T_{frame}*$ frame of the third clock signal's clock cycles corresponding to a predetermined frame interspacing between two successive frames, the frame timing offset ΔS, and a ratio $R_S^V$ between the third clock frequency $F_V$ of the third clock signal CLK_3 and the second clock frequency $F_S$ of the second clock signal CLK_2 (e.g., $R_S^V = F_V/F_S$). For example, the operation of updating the frame pointer FP may be expressed by the following formula.

$$FP_N = FP_{N-1} + T_{frame}* + \Delta S \times R_S^V \qquad (1)$$

The predetermined frame interspacing between two successive frames may be regarded as a frame length. Thus, the counter value $T_{frame}*$ may represent the number of samples per frame. For example, when the third clock frequency $F_V$ is 11.2 MHz and the predetermined frame interspacing between two successive frames is 5 ms, the counter value $T_{frame}*$ would be 56000 (i.e., 11.2 Mhz*5 ms).

Consider a case where the third clock frequency $F_V$ is identical to the second clock frequency $F_S$. Regarding BS's with different signal bandwidths/fundamental sampling frequencies, the counter values $T_{frame}*$ used by the frame pointer management unit 124 would be different from each other. That is, when the receiving/transmitting target is switched from a first BS with a first signal bandwidth/fundamental sampling frequency to a second BS with a second signal bandwidth/fundamental sampling frequency different from the first signal bandwidth/fundamental sampling frequency, the third clock frequency $F_V$ of the third clock signal CLK_3 is changed from the first fundamental sampling frequency to the second fundamental sampling frequency, and the counter value $T_{frame}*$ is adjusted correspondingly.

To prevent the frame pointer management unit 124 from being affected by the switching between different BS's, the present invention therefore proposes that the third clock frequency $F_V$ of the third clock signal CLK_3 is fixed when the second clock frequency $F_S$ of the second clock signal CLK_2 is changed. That is, the third clock signal CLK_3 has a fixed frequency regardless of the fundamental sampling frequency used by a BS with which the MS 100 currently communicates. Besides, the third clock signal CLK_3 has a fixed frequency regardless of the sampling clock frequency of the ADC sampling clock signal CLK_ADC/DAC sampling clock signal CLK_DAC.

It should be noted that the frame timing offset ΔS is derived by processing second samples S2 at a sampling rate corresponding to the second clock frequency $F_S$, and the frame pointer management unit 124 updates and maintains the frame pointer FP according to the third clock frequency $F_V$ which may be different from the second clock frequency $F_S$. Thus, the ratio $R_S^v$ (e.g., $$R_s^v = \frac{F_V}{F_S}$$

is used for converting the number of samples counted under the second clock frequency $F_S$ into the corresponding number of samples counted under the third clock frequency $F_V$.

As mentioned above, the second clock frequency $F_S$ is designed to be identical to the fundamental sampling frequency used by a BS with which the MS 100 currently communicates, where the ideal value of the fundamental sampling frequency is specified in the wireless communication standard. However, it is possible that at least one the actual fundamental sampling frequency used by the BS and the second clock frequency $F_S$ used by the MS 100 is deviated from an ideal fundamental sampling frequency. Thus, there may be a clock frequency offset $\Delta F_{MS}^{BS}$ between the second clock frequency $F_S$ used by the MS 100 and the fundamental sampling frequency used by the BS. As shown in FIG. 1, the frame pointer processing circuit 116 also includes the clock frequency offset estimation unit 128 used for estimating the clock frequency offset $\Delta F_{MS}^{BS}$ between the second clock frequency $F_S$ utilized by the receiver 102 and a specific clock frequency (i.e., a fundamental sampling frequency) utilized by the BS. It should be noted that any clock frequency offset estimation scheme capable of the estimating the clock frequency offset $\Delta F_{MS}^{BS}$ may be employed by the clock frequency offset estimation unit 128.

In a second exemplary implementation, the frame pointer management unit 124 may update the frame pointer FP according to at least the frame timing offset ΔS and the clock frequency offset $\Delta F_{MS}^{BS}$. More specifically, the frame pointer management unit 124 updates the frame pointer FP to the next value (e.g., $FP_N$ for the $N^{th}$ frame) according to the current value (e.g., $FP_{N-1}$ for the $(N-1)^{th}$), the counter value $T_{frame}^*$ of the third clock signal's clock cycles corresponding to the predetermined frame interspacing between two successive frames, the clock frequency offset $\Delta F_{MS}^{BS}$, the frame timing offset ΔS, and the ratio $R_S^v$ between the third clock frequency $F_V$ of the third clock signal CLK_3 and the second clock frequency $F_S$ of the second clock signal CLK_2. For example, the operation of updating the frame pointer FP may be expressed by the following formula.

$$FP_N = FP_{N-1} + T_{frame}^* \times (1 - \Delta F_{MS}^{BS}) + \Delta S \times R_S^v \quad (2)$$

It should be noted that the counter value $T_{frame}^*$ is equal to the third clock signal's clock cycles corresponding to the predetermined frame interspacing (e.g., 5 ms). Suppose that a counter value $T_{frame}$ is equal to the second clock signal's clock cycles corresponding to the predetermined frame interspacing. The counter value $T_{frame}$ and the counter value $T_{frame}^*$ satisfy the following formula.

$$T_{frame}^* = T_{frame} \times R_s^v \quad (3)$$

Thus, though the clock frequency offset $\Delta F_{MS}^{BS}$ is estimated between the second clock frequency $F_S$ used by the MS 100 and the fundamental sampling frequency used by the BS, the variation of the counter value satisfies the following formula.

$$T_{frame} \times (1 - \Delta F_{MS}^{BS}) \times R_S^v = T_{frame}^* \times (1 - \Delta F_{MS}^{BS}) \quad (4)$$

That is, the frame pointer management unit 124 uses the clock frequency offset $\Delta F_{MS}^{BS}$ generated from the clock frequency offset estimation unit 128 for fine tuning the counter value $T_{frame}^*$ of the third clock signal's clock cycles corresponding to the predetermined frame interspacing (e.g., 5 ms).

Similarly, in the second exemplary implementation, the third clock frequency $F_V$ of the third clock signal CLK_3 is fixed when the second clock frequency $F_S$ of the second clock signal CLK_2 is changed. That is, the third clock signal CLK_3 has a fixed frequency regardless of the fundamental sampling frequency used by a BS with which the MS 100 currently communicates. Besides, the third clock signal CLK_3 has a fixed frequency regardless of the sampling clock frequency of the ADC sampling clock signal CLK_ADC and/or DAC sampling clock signal CLK_DAC. The same objective of preventing the frame pointer management unit 124 from being affected by the switching between different BS's is achieved.

In the first and second exemplary implementations mentioned above, the frame pointer FP for a BS with which the MS 100 currently communicates will be updated according to aforementioned formula (1) or formula (2). Regarding frame pointers for other BS's which are not currently communicate with the MS 100, the frame pointer management unit 124 adds the counter value $T_{frame}^*$ to the frame pointers, respectively.

As mentioned above, the frame pointer processing circuit 116 generates and updates the frame pointer FP for each BS according to at least the output signal $S_R$ of the receiver 102. The frame timing control unit 114 is coupled to the timer 112, the receiver 102 and the transmitter 104, and implemented for triggering the receiver 102 to start receiving transmitted information of a BS or for triggering the transmitter 104 to start transmitting information to a BS according to at least the frame pointer FP and the timer value $N_{timer}$. Please note that the first clock frequency $F_{timer}$ of the first clock signal CLK_1 may be designed to be coherent with (i.e., identical to) the sampling clock frequency $F_{ADC}/F_{ADC}$. In a case where the adjustment amount added to the timer value $N_{timer}$ per clock cycle of the first clock signal CLK_1 is a constant integral value (e.g., 1), all of the frame pointers maintained by the frame pointer management unit 124 need to be properly adjusted when the sampling clock frequency $F_{ADC}/F_{ADC}$ is changed. As a result, additional computation is required for adjusting a frame pointer for each BS.

Therefore, to simply the overall frame timing control design, the present invention therefore proposes configuring the timer 112 to adaptively adjust an adjustment amount (e.g., an increment) added to the timer value $N_{timer}$ per clock cycle of the first clock signal CLK_1 in response to the adjustment of the first clock frequency $F_{timer}$. By way of example, but not limitation, the timer 112 is arranged to provide the timing information corresponding to clock cycles of the third clock signal CLK_3 which has a fixed clock frequency $F_V$ regardless of the BS with which the MS 100 currently communicates. For instance, the adjustment amount is inversely proportional to the first clock frequency $F_{timer}$. In one exemplary implementation, the adjustment amount is set by $$\frac{F_V}{F_{timer}}$$

which may be a variable fractional value instead of a constant integral value.

The frame timing control unit 114 aims at determining a start location of first samples S1/S1' to be really processed for reception/transmission by referring to the frame pointer FP and the timer value $N_{timer}$. For example, the frame timing control unit 114 triggers the receiver 102/transmitter 104 according to the frame pointer FP, the timer value $N_{timer}$, a ratio $R_{timer}^v$ between the third clock frequency $F_V$ and the first clock frequency $F_{timer}$ (e.g., $$R_{timer}^v = \frac{F_V}{F_{timer}}),$$

a ratio $R_S^v$ between the third clock frequency $F_V$ and the second clock frequency $F_S$ (e.g., $$R_s^v = \frac{F_V}{F_S}),$$

and a counter value Y of the second clock signal's clock cycles corresponding to a time-domain advanced start time. As the start time for reception/transmission as indicated by the frame pointer FP is not necessarily aligned with the time point indicated by the timer value $N_{timer}$ which is adjusted by an adjustment amount per clock cycle, the frame timing control unit 114 is configured to generate a start trigger signal $S_T$ to the RX datapath 134/TX datapath 144 and generates an initial delay (e.g., a fractional delay) U to the interpolator 136/146 when the timer value $N_{timer}$ reaches a specific timer value X. For example, the frame timing control unit 114 may determine the initial delay U according to the following formula.

$$FP = X + U \times R_{timer}^v + Y \times R_S^v \tag{5}$$

Figure 3:
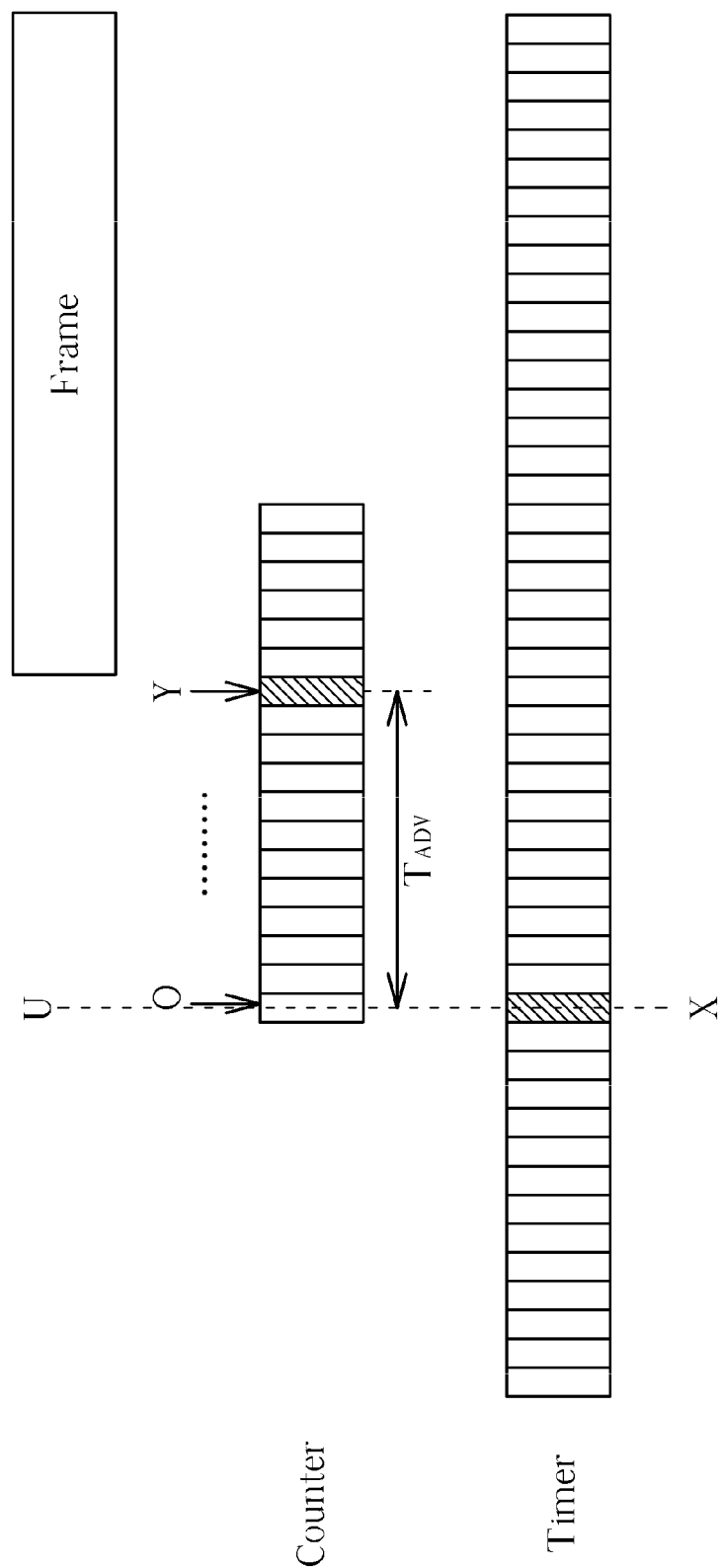
FIG. 3 is a diagram illustrating the frame timing control performed by the frame timing control unit.

Please refer to FIG. 3, which is a diagram illustrating the frame timing control performed by the frame timing control unit 114. Taking the receiver 102 for example, the RX datapath 134 is enabled at a time point prior to a start time of a frame to be received. As shown in FIG. 1 and FIG. 3, the RX datapath 138 has a physical counter for counting the second samples generated from the preceding interpolator 136, and receives Y samples before the leading sample of the frame is received. Thus, there is a time-domain advanced start time $T_{ADV}$ corresponding to Y samples (i.e., Y clock cycles of the second clock signal CLK_2). It should be noted that the time-domain advanced start time $T_{ADV}$ is pre-defined, which means that the counter value Y is a predetermined value. In addition, when the interpolator 136 receives a leading first sample S1, and output of a corresponding leading second sample S2 would be delayed by the initial delay U. Thus, the start time for reception is equivalently adjusted by means of the interpolator 136.

In addition, when the timer value $N_{timer}$ adjusted by the adjustment amount (e.g., $$R_{timer}^v = \frac{F_V}{F_{timer}})$$

reaches the specific timer value X, the frame timing control unit 114 generates the start trigger signal $S_T$ correspondingly. In view of above formula (5), a skilled person should readily appreciate that the initial delay U can be calculated and determined when the specific timer value X is identified.

In one exemplary design, the frame timing control unit 114 calculates a preliminary timer value $X_{start}$, where $X_{start} = FP - Y \times R_S^v$. Next, upon receiving the timer value $N_{timer}$ generated and updated by the timer 112 in each clock cycle, the frame timing control unit 114 checks if the following inequality is satisfied.

$$N_{timer} \leq X_{start} < N_{timer} + R_{timer}^v \tag{6}$$

The frame timing control unit 114 keeps checking the above inequality until the latest timer value $N_{timer}$ generated from the timer 112 satisfies the inequality. Next, the frame timing control unit 114 calculates the initial delay U as follows.

$$U = (X_{start} - X) \times \frac{1}{R_{timer}^v} \tag{7}$$

In above formula (7), X is equal to the timer value $N_{timer}$ satisfying the aforementioned inequality. Please refer to FIG. 4, which is a flowchart illustrating a method of controlling the start time of the reception according to a first exemplary embodiment of the present invention. Provided that the result is substantially the same, the steps are not required to be executed in the exact order shown in FIG. 4. The exemplary method may be briefly summarized as follows.

Step 400: Start.

Step 402: Calculate a preliminary timer value $X_{start}$, where $X_{start} = FP - Y \times R_S^v$.

Step 404: Receive the timer value $N_{timer}$ from a timer.

Step 406: Check if the timer value $N_{timer}$ satisfies the inequality: $N_{timer} \leq X_{start} < N_{timer} + R_{timer}^v$. If yes, go to step 410; otherwise, go to step 408:

Step 408: Utilize the timer to update the timer value $N_{timer}$ by adding an adjustment amount (i.e., an increment) $R_{timer}^v$ to the timer value $N_{timer}$. Go to step 404.

Step 410: Calculate the initial delay U by the formula:

$$U = (X_{start} - X) \times \frac{1}{R_{timer}^v}.$$

Step 412: Output a start trigger signal ST to the RX datapath 134 and the initial delay U to the interpolator 136, respectively.

Step 414: End.

Figure 4:
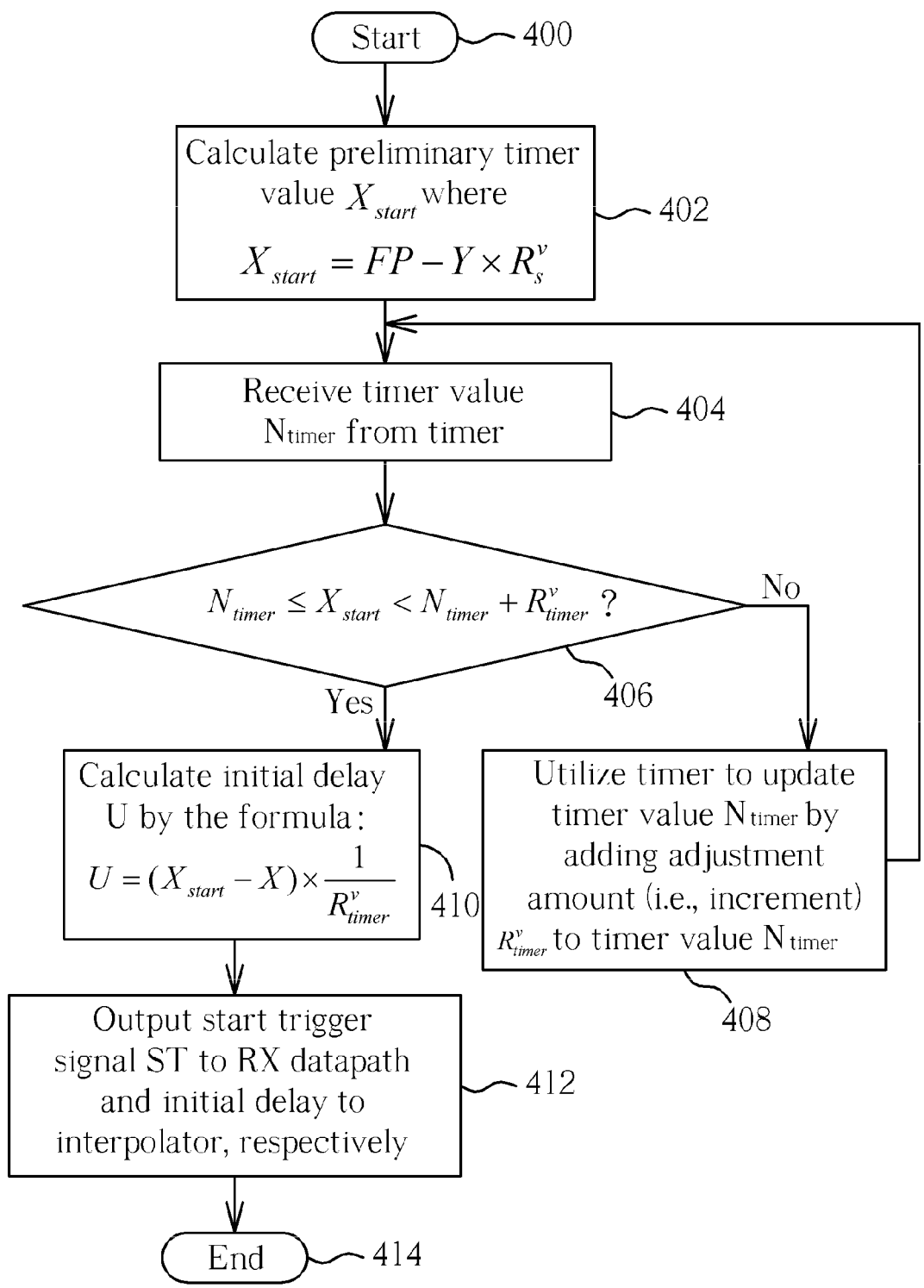
FIG. 4 is a flowchart illustrating a method of controlling the start time of the reception according to a first exemplary embodiment of the present invention.

As a person skilled in the art can readily understand operations of each step shown in FIG. 4 after reading above paragraphs, further description is omitted here for brevity.

Since both of X and U are fractional values, the frame timing control unit 114 may have difficulty in determining the initial delay U in time due to limited computing power. To solve this problem, the present invention proposes an improve frame timing control scheme which calculates the initial delay U in advance. For example, the frame timing control unit 114 calculates a preliminary timer value $X_{start}$, where $X_{start}=FP-Y \times R_s^v$. Next, the frame timing control unit 114 finds two adjacent estimated timer values $X_{k-1}$ and $X_k$ before the timer value $N_{timer}$ generated from the timer reaches the estimated timer value $X_{k-1}$, where $X_k=X_{k-1}+R_{timer}^v$ and $X_{k-1} \leq X_{start} < X_k$. After the estimated timer values $X_{k-1}$ and $X_k$ are found, the frame timing control unit 114 calculates the initial delay U by the following formula.

$$U = (X_{start} - X_{k-1}) \times \frac{1}{R_{timer}^v} \quad (8)$$

Figure 5:
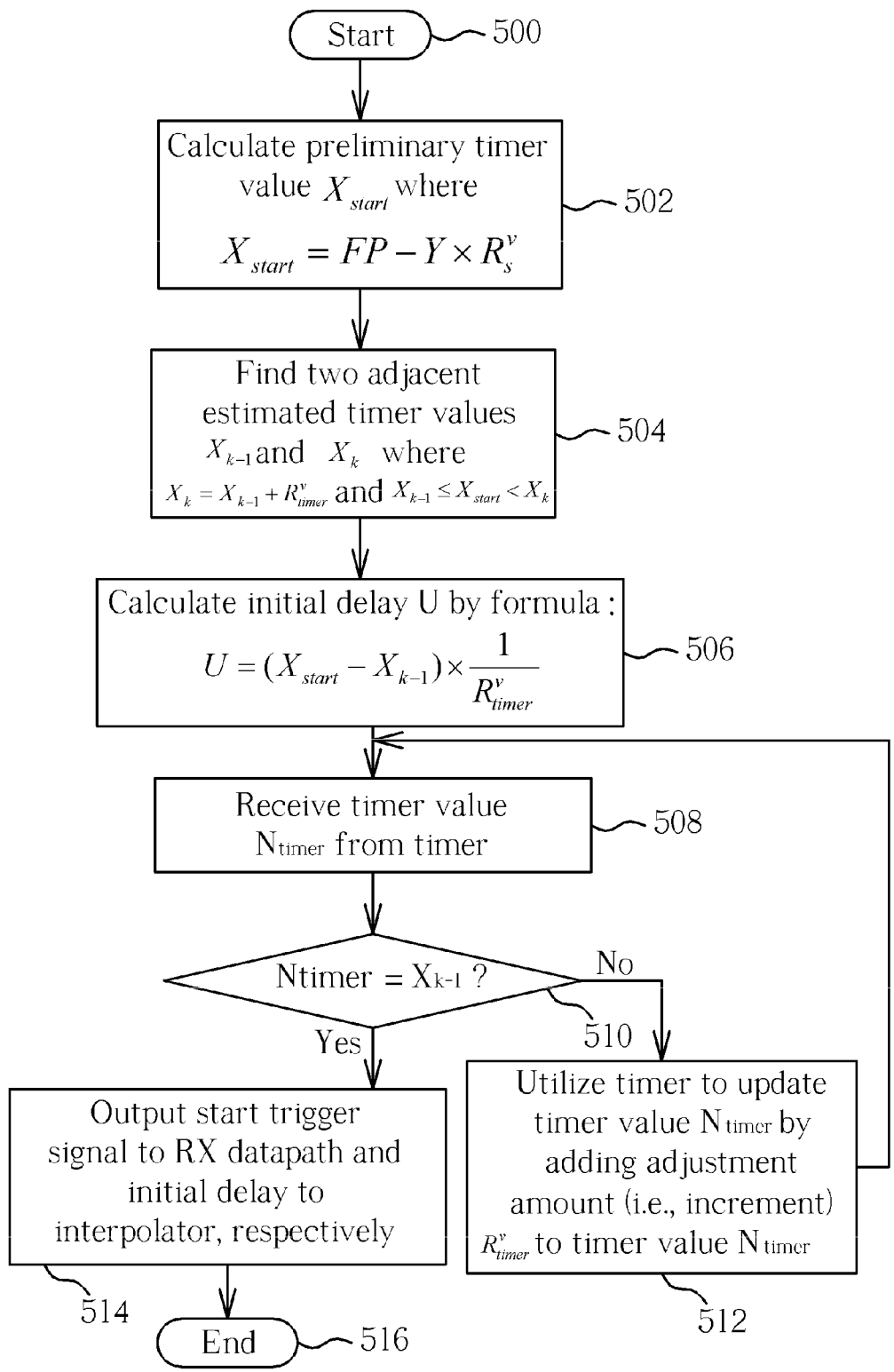
FIG. 5 is a flowchart illustrating a method of controlling the start time of reception according to a second exemplary embodiment of the present invention.

Please refer to FIG. 5, which is a flowchart illustrating a method of controlling the start time of reception according to a second exemplary embodiment of the present invention. Provided that the result is substantially the same, the steps are not required to be executed in the exact order shown in FIG. 5. The exemplary method may be briefly summarized as follows.

Step 500: Start.

Step 502: Calculate a preliminary timer value $X_{start}$, where $X_{start}=FP-Y \times R_s^v$.

Step 504: Find two adjacent estimated timer values $X_{k-1}$ and $X_k$, where $X_k=X_{k-1}+R_{timer}^v$ and $X_{k-1} \leq X_{start} < X_k$.

Step 506: Calculate the initial delay U by the formula:

$$U = (X_{start} - X_{k-1}) \times \frac{1}{R_{timer}^v}.$$

Step 508: Receive the timer value $N_{timer}$ from a timer.

Step 510: Check if the timer value $N_{timer}$ reaches the estimated timer value $X_{k-1}$. If yes, go to step 514; otherwise, go to step 512.

Step 512: Utilize the timer to update the timer value $N_{timer}$ by adding an adjustment amount (e.g., an increment) $R_{timer}^v$ to the timer value $N_{timer}$. Go to step 508.

Step 514: Output a start trigger signal ST to the RX datapath 134 and the initial delay U to the interpolator 136, respectively.

Step 516: End.

As a person skilled in the art can readily understand operations of each step shown in FIG. 5 after reading above paragraphs, further description is omitted here for brevity.

Regarding the transmitter 104, it may be controlled by the frame timing control unit 114 employing a frame timing control scheme similar to that used for controlling the receiver 102. As a person skilled in the art can readily understand details directed to generating the start trigger signal ST to the TX datapath 144 and generating the initial delay U to the interpolator 146 after reading above paragraphs, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A frame timing controller, comprising:
a timer, arranged to generate a timer value according to a first clock signal with a first clock frequency;
a frame timing control unit, coupled to the timer, for triggering at least a receiver to start receiving transmitted information of a base station according to at least a frame pointer and the timer value, wherein the receiver processes an input signal to generate first samples at a first sampling rate corresponding to a sampling clock frequency, and processes the first samples to generate an output signal including second samples at a second sampling rate corresponding to a second clock frequency of a second clock signal, the second clock frequency is different from the sampling clock frequency, and a start time of receiving the transmitted information of the base station is determined by the frame timing control unit based on at least the frame pointer and the timer value; and
a frame pointer processing circuit, coupled to the frame timing control unit, for generating and updating the frame pointer according to at least the output signal of the receiver.

2. The frame timing controller of claim 1, wherein the first clock frequency is coherent with the sampling clock frequency.

3. The frame timing controller of claim 1, wherein an adjustment amount added to the timer value per clock cycle of the first clock signal is adaptively adjusted in response to an adjustment of the first clock frequency.

4. The frame timing controller of claim 3, wherein the adjustment amount is inversely proportional to the first clock frequency.

5. The frame timing controller of claim 1, wherein the frame pointer processing circuit comprises:
a frame pointer management unit, arranged to generate and maintain the frame pointer for the base station according to a third clock signal with a third clock frequency; and
a frame timing offset estimation unit, coupled to the receiver and the frame pointer management unit, for estimating a frame timing offset between a receiver start time of receiving the transmitted information and an actual frame start time of a frame according to the output signal, wherein the frame pointer management unit updates the frame pointer according to at least the frame timing offset.

6. The frame timing controller of claim 5, wherein the frame pointer management unit updates the frame pointer to a next value according to a current value of the frame pointer, a counter value of the third clock signal's clock cycles corresponding to a predetermined frame interspacing between two successive frames, the frame timing offset, and a ratio between the third clock frequency and the second clock frequency.

7. The frame timing controller of claim 6, wherein the frame pointer management unit updates the frame pointer according to the following formula:

$$FP_N = FP_{N-1} + T_{frame}^* + \Delta S \times R_s^v,$$

where $FP_N$ represents the next value of the frame pointer, $FP_{N-1}$ represents the current value of the frame pointer, $T_{frame}^*$ represents the counter value of the third clock signal's clock cycles corresponding to the predetermined frame interspacing between two successive frames, $\Delta S$ represents the frame timing offset, and $R_s^v$ represents the ratio between the third clock frequency and the second clock frequency.

8. The frame timing controller of claim 5, wherein the frame pointer processing circuit further comprises:
a clock frequency offset estimation unit, arranged to estimate a clock frequency offset between the second clock frequency utilized by the receiver and a specific clock frequency utilized by the base station, wherein the frame pointer management unit updates the frame pointer according to at least the frame timing offset and the clock frequency offset.

9. The frame timing controller of claim 8, wherein the frame pointer management unit updates the frame pointer to a next value according to a current value of the frame pointer, a counter value of the third clock signal's clock cycles corresponding to a predetermined frame interspacing between two successive frames, the clock frequency offset, the frame timing offset, and a ratio between the third clock frequency and the second clock frequency.

10. The frame timing controller of claim 9, wherein the frame pointer management unit updates the frame pointer according to the following formula:

$$FP_N = FP_{N-1} + T_{frame}^* \times (1 - \Delta F_{MS}^{BS}) + \Delta S \times R_s^v,$$

where $FP_N$ represents the next value of the frame pointer, $FP_{N-1}$ represents the current value of the frame pointer, $T_{frame}^*$ represents the counter value of the third clock signal's clock cycles corresponding to the predetermined frame interspacing between two successive frames, $\Delta F_{MS}^{BS}$ represents the clock frequency offset, $\Delta S$ represents the frame timing offset, and $R_s^v$ represents the ratio between the third clock frequency and the second clock frequency.

11. The frame timing controller of claim 5, wherein the third clock frequency of the third clock signal is fixed when the second clock frequency of the second clock signal is changed.

12. The frame timing controller of claim 5, wherein an adjustment amount added to the timer value per clock cycle of the first clock signal is set by $$\frac{F_V}{F_{timer}},$$

where $F_{timer}$ represents the first clock frequency, and $F_V$ represents the third clock frequency.

13. The frame timing controller of claim 1, wherein the frame timing control unit triggers the receiver according to the frame pointer, the timer value, a ratio between the third clock frequency and the first clock frequency, a ratio between the third clock frequency and the second clock frequency, and a counter value of the second clock signal's clock cycles corresponding to a time-domain advanced start time.

14. The frame timing controller of claim 13, wherein the receiver includes an analog-to-digital converter (ADC) for generating the first samples according to the sampling clock frequency, a receiver datapath which starts receiving an output of the ADC when triggered by the frame timing control unit, and an interpolator for generating the second samples according to an output of the receiver datapath, the second clock frequency of the second clock signal, and an initial delay generated from the frame timing control unit; and the frame timing control unit determines the initial delay according to the following formula:

$$FP = X + U \times R_{timer}^v + Y \times R_s^v,$$

where FP represents the frame pointer, X is the timer value, U represents the initial delay, $R_{timer}^v$ represents the ratio between the third clock frequency and the first clock frequency, Y represents the counter value of the second clock signal's clock cycles corresponding to the time-domain advanced start time, and $R_s^v$ represents the ratio between the third clock frequency and the second clock frequency.

15. The frame timing controller of claim 14, wherein the frame timing control unit calculates a preliminary timer value $X_{start}$, where $X_{start} = FP - Y \times R_s^v$, finds two adjacent estimated timer values $X_{k-1}$ and $X_k$ before the timer value generated from the timer reaches the estimated timer value $X_{k-1}$, where $X_{k-1} \leq X_{start} < X_k$, and calculates the initial delay U by the following formula:

$$U = (X_{start} - X_{k-1}) \times \frac{1}{R_{timer}^v}.$$

16. A frame timing control method, comprising:
generating a timer value according to a first clock signal with a first clock frequency;
triggering at least a receiver to start receiving transmitted information of a base station according to at least a frame pointer and the timer value, wherein the receiver processes an input signal to generate first samples at a first sampling rate corresponding to a sampling clock frequency of a sampling clock signal and processes the first samples to generate an output signal including second samples at a second sampling rate corresponding to a second clock frequency of a second clock signal, the second clock frequency is different from the sampling clock frequency, and a start time of receiving the transmitted information of the base station is determined based on at least the frame pointer and the timer value; and
generating and updating the frame pointer according to at least the output signal of the receiver.

17. The frame timing control method of claim 16, wherein the first clock frequency is coherent with the sampling clock frequency.

18. The frame timing control method of claim 16, wherein generating the timer value comprises:
adaptively adjusting an adjustment amount in response to an adjustment of the first clock frequency; and
adding the adjustment amount to the timer value per clock cycle of the first clock signal.

19. The frame timing control method of claim 18, wherein adaptively adjusting the adjustment amount comprises:
setting the adjustment amount that is inversely proportional to the first clock frequency.

20. The frame timing control method of claim 16, wherein generating and updating the frame pointer according to the output signal of the receiver comprises:
generating and maintaining the frame pointer for the base station according to a third clock signal with a third clock frequency; and
estimating a frame timing offset between a receiver start time of receiving the transmitted information and an actual frame start time of a frame according to the output signal, wherein the frame pointer is updated according to at least the frame timing offset.

21. The frame timing control method of claim 20, wherein generating and maintaining the frame pointer for the base station according to the third clock signal with the third clock frequency comprises:
updating the frame pointer to a next value according to a current value of the frame pointer, a counter value of the third clock signal's clock cycles corresponding to a predetermined frame interspacing between two successive frames, the frame timing offset, and a ratio between the third clock frequency and the second clock frequency.

22. The frame timing control method of claim 21, wherein the frame pointer is updated according to the following formula:

$$FP_N = FP_{N-1} + T_{frame}{}^* + \Delta S \times R_s{}^v,$$

where $FP_N$ represents the next value of the frame pointer, $FP_{N-1}$ represents the current value of the frame pointer, $T_{frame}{}^*$ represents the counter value of the third clock signal's clock cycles corresponding to the predetermined frame interspacing between two successive frames, $\Delta S$ represents the frame timing offset, and $R_s{}^v$ represents the ratio between the third clock frequency and the second clock frequency.

23. The frame timing control method of claim 20, wherein generating and updating the frame pointer according to the output signal of the receiver further comprises:
    estimating a clock frequency offset between the second clock frequency utilized by the receiver and a specific clock frequency utilized by the base station, wherein the frame pointer is updated according to at least the frame timing offset and the clock frequency offset.

24. The frame timing control method of claim 23, wherein the frame pointer is updated to a next value according to a current value of the frame pointer, a counter value of the third clock signal's clock cycles corresponding to a predetermined frame interspacing between two successive frames, the clock frequency offset, the frame timing offset, and a ratio between the third clock frequency and the second clock frequency.

25. The frame timing control method of claim 24, wherein the frame pointer is updated according to the following formula:

$$FP_N = FP_{N-1} + T_{frame}{}^* \times (1 - \Delta F_{MS}{}^{BS}) + \Delta S \times R_s{}^v,$$

where $FP_N$ represents the next value of the frame pointer, $FP_{N-1}$ represents the current value of the frame pointer, $T_{frame}{}^*$ represents the counter value of the third clock signal's clock cycles corresponding to the predetermined frame interspacing between two successive frames, $\Delta F_{MS}{}^{BS}$ represents the clock frequency offset, $\Delta S$ represents the frame timing offset, and $R_s{}^v$ represents the ratio between the third clock frequency and the second clock frequency.

26. The frame timing control method of claim 20, wherein the third clock frequency of the third clock signal is fixed when the second clock frequency of the second clock signal is changed.

27. The frame timing control method of claim 20, wherein an adjustment amount added to the timer value per clock cycle of the first clock signal is set by $$\frac{F_V}{F_{timer}},$$

where $F_{timer}$ represents the first clock frequency, and $F_V$ represents the third clock frequency.

28. The frame timing control method of claim 16, wherein triggering at least the receiver to start receiving transmitted information of the base station comprises:
    triggering the receiver according to the frame pointer, the timer value, a ratio between the third clock frequency and the first clock frequency, a ratio between the third clock frequency and the second clock frequency, and a counter value of the second clock signal's clock cycles corresponding to a time-domain advanced start time.

29. The frame timing control method of claim 28, wherein the receiver includes an analog-to-digital converter (ADC) for generating the first samples according to the sampling clock frequency, a receiver datapath which starts receiving an output of the ADC when triggered, and an interpolator for generating the second samples according to an output of the receiver datapath, the second clock frequency of the second clock signal, and an initial delay; and triggering the receiver comprises determining the initial delay according to the following formula:

$$FP = X + U \times R_{timer}{}^v + Y \times R_s{}^v,$$

where FP represents the frame pointer, X is the timer value, U represents the initial delay, $R_{timer}{}^v$ represents the ratio between the third clock frequency and the first clock frequency, Y represents the counter value of the second clock signal's clock cycles corresponding to the time-domain advanced start time, and $R_s{}^v$ represents the ratio between the third clock frequency and the second clock frequency.

30. The frame timing control method of claim 29, wherein determining the initial delay comprises:
    calculating a preliminary timer value $X_{start}$, where $X_{start} = FP - Y \times R_s{}^v$;
    finding two adjacent estimated timer values $X_{k-1}$ and $X_k$ before the timer value reaches the estimated timer value $X_{k-1}$, where $X_{k-1} \leq X_{start} < X_k$; and
    calculating the initial delay U by the following formula:

$$U = (X_{start} - X_{k-1}) \times \frac{1}{R_{timer}^v}.$$

31. A frame timing controller applied to a mobile station capable of communicating with a plurality of base stations having different signal bandwidths, comprising:
    a timer, arranged to generate a timer value according to a first clock signal;
    a frame timing control unit, coupled to the timer, for triggering at least a receiver of the mobile station to start receiving transmitted information of a specific base station of the base stations according to at least a specific frame pointer of the specific base station and the timer value;
    a frame timing offset estimation unit, coupled to the receiver, for estimating a frame timing offset between a receiver start time of receiving the transmitted information and an actual frame start time of a frame according to an output signal of the receiver; and
    a frame pointer management unit, coupled to the frame timing control unit and the frame timing offset estimation unit, for generating and maintaining a plurality of frame pointers for the base stations according to a second clock signal with a fixed clock frequency, wherein the specific frame pointer is updated according to at least the frame timing offset and a counter value of the second clock signal's clock cycles corresponding to a predetermined frame interspacing between two successive frames, and remaining frame pointers are updated according to the counter value.

32. A frame timing control method applied to a mobile station capable of communicating with a plurality of base stations having different signal bandwidths, comprising:
    generating a timer value according to a first clock signal;
    triggering at least a receiver of the mobile station to start receiving transmitted information of a specific base station of the base stations according to at least a specific frame pointer of the specific base station and the timer value;

estimating a frame timing offset between a receiver start time of receiving the transmitted information and an actual frame start time of a frame according to an output signal of the receiver; and generating and maintaining a plurality of frame pointers for the base stations according to a second clock signal with a fixed clock frequency, wherein the specific frame pointer is updated according to at least the frame timing offset and a counter value of the second clock signal's clock cycles corresponding to a predetermined frame interspacing between two successive frames, and remaining frame pointers are updated according to the counter value.

* * * * *